Patented Apr. 9, 1940

2,196,325

UNITED STATES PATENT OFFICE 2,196,325

MAGNESIUM TITANATES AND METHODS OF MAKING SAME

John A. Plunkett and Eugene Wainer, Niagara Falls, N. Y., assignors to The Titanium Alloy Manufacturing Company, New York, N. Y., a corporation of Maine No Drawing. Application March 5, 1938, Serial No. 194,078

5 Claims. (Cl. 134—58)

Our invention relates to a new and improved pigment composition based on magnesium titanate and methods of preparing same.

Magnesium titanate is an already known material, and its properties and mode of preparation have already been described. The usual methods of preparation have as their foundation the calcination of proper mixtures of pure magnesia and pure titania at elevated temperatures for definite time periods. The material has been described as a pigment of brilliant whiteness and of fair hiding power in paints, varnishes, cosmetics, rubber, resins, etc. However, in dealing experimentally with known processes, we have found great difficulty in attempting to hold the quality and hiding power of such material uniform from batch to batch.

We have found that the older methods of preparing magnesium titanate result in a material consisting of relatively large particles, 5 to 20 microns in diameter and having an index of refraction of approximately 2.11. When the conditions are regulated for obtaining a complete reaction, the particle sizes vary from batch to batch, even though the physical conditions of treatment are the same. Such particle sizes we have found are highly sensitive to slight or inadvertent changes in conditions of preparation. Furthermore we have found that, in using old processes in order to attain a complete reaction, the finally reacted particles must grow to sizes within the range from about 5 to 20 microns.

In connection with our magnesium titanate experiments, we have also found that the hiding power of pigments in the media mentioned, other factors such as refractive index, dispersion, remaining equal, is a direct function of their particle size, said particle size being particular for each type of material under consideration.

Our experiments and tests have also shown that the optimum size range for magnesium titanate base pigments lies between 0.5 to 2.0 microns; that particles much larger than 2.0 microns and much smaller than 0.5 micron rapidly fall away in hiding power; that uniformity size in the necessary range is most important; even though some of the particles may fall in the range mentioned, it is necessary that the bulk of the material fall uniformly within this range; and finally, that these optimum effects can not be obtained by milling the coarser material.

We have discovered a new composition of matter and methods of making same that consists chiefly of magnesium titanate which has the brilliant whiteness of older forms of magnesium titanate, a particle size falling wholly in the range 0.5 to 2.0 microns, a higher index of refraction 2.15 as against 2.11 for the older form, and has 50 to 100% increased covering power over the older forms in its use as a pigment. Such covering power and quality are an item of absolute process control for reasons inherent in our improved methods of preparing same.

The particle size of pigments bears an important relation to their hiding power.

For example, we may take two systems of different sized particles, each consisting of perfect cubes dispersed in the same liquid. In A system, the particles having a uniform and certain particle size are uniformly dispersed showing one face only.

In B system, the same weight of particles of the same type of materials are similarly dispersed, but the particles have a uniform and predetermined size much larger than in the A system. Furthermore, we have assumed that the particles in both systems have substantially the same refractive index, the refractive index of the matrix being highly different from the disperse phase so that the particles are substantially opaque to incident light. The particles are arranged one layer deep in both systems.

Under these conditions it will be obvious that the hiding power is directly proportional to exposed area of particles, with the larger the exposed area of a single particle, the greater the hiding power of the single particle, in accordance with the following formula (1):

$$y = \frac{bx}{a}$$

where $a$ is the effective area of the small particle and $b$ is the effective area of the larger particle, $x$ is the hiding power of the small particle, $y$ is the hiding power of the larger particle.

Numerically this shows that a single large particle has a higher covering power than a single small particle. However, since there is the same weight of particles in each system, the total exposed area of the smaller particle system A is greater than that for the larger particle system B according to the following formula (2):

$$\frac{\frac{W}{W_A} \times a}{\frac{W}{W_B} \times b} = r = \frac{W_B a}{W_A b}$$

where
W is the total weight of particles in each system.

$W_A$ is the weight of single particle of effective area $a$.

$W_B$ is the weight of single particle of effective area $b$.

$r$ is the ratio of exposed areas and hiding power.

As a corollary to equation "2", where a single large cube is divided into cubes of size equal to that of a certain small cube, the ratio of hiding power of large particle to small is given by equation "1". The further increase in hiding power occasioned by the subdivision is given by the formula (3) as follows:

$$r' = \frac{nx}{bx} = \frac{na}{b}$$
$$\phantom{r'=}\frac{}{a}$$

where $r'$ = hiding power ratio occasioned by subdivision.
$n$ = number of particles obtained by subdivision.
$a$, $b$, $x$ have same significance as in equation "1".

Substituting numerical values by comparing the difference in hiding power between a cube 2 microns on edge and a cube 4 microns on edge, and assuming the hiding power of 2 microns particle = 1.

Then in equation "1"

$$y = \frac{16 \times 1}{4} = 4$$

so that the larger particle has 4 times the inherent hiding power as the small one.

For equation "2" the 2 microns particle weighs 1 unit which makes a weight of 8 units for the 4 microns particle.

Thus $$r = \frac{8 \times 4}{1 \times 16} = 2$$

In short, a system containing only particles of 2 micron size will have twice the hiding power of a similar system containing the same weight of similarly dispersed 4 micron particles.

Using equation "3" in respect to the 2 micron and 4 micron particles $$r' = \frac{8 \times 4}{16}$$

subdivision of the 4 micron particle into cubes 2 microns on edge produces a system of twice the hiding power of the original single 4 micron particle.

Outside of the differences in refractive indices and dispersion, other factors will modify the results. For example, shapes will vary between cubes and spheres, and any variation toward spherical will further accentuate the advantage of fine particle size over coarse. Actually, the shape factor most important to hiding power is the effective exposed area, and not normally the actual exposed area. Furthermore, the higher the refractive index of a material, the greater the hiding power as dispersed in a definite medium. Our novel magnesium titanate composition has a refractive index of 2.15 as against 2.11 for magnesium titanate made by known methods, so we obtain an increase in hiding power in this respect.

We have also found that the effective exposed area of our novel magnesium titanate base pigment is a maximum when the particles are in the 0.5 to 2.0 microns size. This effective exposed area is more or less a constant for each different type material. For example, we have found that the effective exposed area of another pigment handled by us at the same time, the hiding power is a maximum when the particles are approximately 0.4 micron in diameter.

The upper limit of size 2.0 microns is dependent (in case of magnesium titanate) on the factors hereinbefore described. The lower limit of size, 0.5 micron, is the size below which the reaction is not normally complete. In other words, conditions leading to completeness of the reaction in the size range desired are the limiting factors.

We have attempted to increase the hiding power of the old form of magnesium titanate by proper milling methods at various times, but with little or no success, even though some comminution takes place from the coarser limits of size. Such ineffective result is evidently due to the fact that although some milling does take place, the fracture of the grains is accomplished in such a way that the effective exposed area is in no way increased. Hence the essentially desired increase in effective exposed area of the particle must be reached by methods other than simple comminution of coarser particles insofar as our magnesium titanate composition is concerned.

Our improved methods comprise chiefly the addition of agents to the usual magnesium titanate batch which will allow the easy control of uniform particle size in the heating step within the limits mentioned, viz: 0.5 to 2.0 microns, which is not subject to variation from batch to batch, or through small changes in heating temperatures. Furthermore, these agents permit the complete reaction of the reactants before the particles have become too coarse for proper hiding power.

Our preferred method consists chiefly in adding a small percentage of alumina, or some compound of alumina, which yields the oxide on calcination, such as aluminum hydrate, aluminum sulphate, aluminum nitrate, ammonium alum, and the like, or an alumina bearing material, such as clay, pyrophyllite, mullite, spinel, together with some form of silica, such as milled quartz, precipitated silica. We then mix these agents with the magnesia-titania batch in a specified manner so that the ratio of silica to alumina is not less than 8:1 and not more than 12:1, parts by weight, with a preferred ratio of 10:1, and so that the silica-alumina addition does not exceed 12%, or is less than 3%, of the total batch. The magnesium titanate base may be prepared by the proper intimate mixture of magnesia and titania or any compound of either which yields the oxide on calcination, in the ratio of one mol of magnesia to one mol of titania, the mixing being done by wet or dry milling or by mixing the ingredients in solution.

Furthermore, we have found that unless the mixture of these ingredients is made in a particular manner, a properly reacted end product cannot be obtained. We have found that it is necessary to add the silica and alumina bearing materials to the already intimately mixed and properly proportioned magnesia and titania constituents. This is true whether mixing takes place in solution or in solid form. If this is not done, that is to say, if the ingredients are mixed all together at the same time we have found that more than one reaction product is obtained, and that the bulk of the material does not have the desired characteristics which we have described. When mixed in the batch in accordance with our improved methods, only a single reaction product is obtained, and the bulk of the material has the desired characteristics.

When TiO₂ in solid calcined form is one of the raw materials used in the batch, the proper reaction takes place at the temperature range of 2100° F. to 2700° F. For this reaction about 12 hours is necessary at 2100° F. and about 30 minutes at the upper limit of 2700° F. Incipient fusion and destruction of desired properties occur above 2700° F. We prefer to use calcination at 2400° F. for 3 to 3.5 hours where the reaction takes place with sufficient slowness whereby strict laboratory control is easily possible.

We have found, however, that when the titanic acid and magnesia are mixed in soluble form, the final calcine reaction is properly completed in 1 to 2 hours at 1800 to 1900° F. Much higher temperatures cause an undesired growth of the particles above the limits of the sizes we have mentioned. Decomposition of sulphates are complete as shown by analytical test of final product.

The following examples will illustrate our improved methods of making our improved magnesium titanate compositions.

*Example 1.*—9.6 kilograms of magnesium carbonate powder (of 42% magnesium oxide content) are mixed with 8.0 kilograms of pure titanium dioxide. Sufficient water is added to reach proper milling consistency, and 352 grams of high grade clay (containing 36% alumina) and 1100 grams of milled quartz are then added to the mill. The whole mass is then milled for 1 hour, and the well-mixed slip is suitably dried. The dried slip is disintegrated and tumbled to obviate errors due to possible segregation in drying, and the disintegrated mix is calcined at 2400° F. for 3.5 hours, thereby producing a material wholly within the particle size range 0.5 to 2.0 microns, the bulk of the material being in particle size from 0.8 to 1.2 microns with an index of refraction of 2.15. Yield was 13.5 kilograms.

An analysis of the compound in the foregoing example was approximately as follows:

| | Per cent |
|---|---|
| MgO | 29.34 |
| TiO₂ | 59.01 |
| SiO₂ | 9.90 |
| Al₂O₃ | 0.96 |
| Others | 0.79 |
| | 100.00 |

*Example 2.*—4.03 kilograms of calcined magnesia were mixed with 8.0 kilograms of pure titanium dioxide. Sufficient water is added to reach proper milling consistency, and 195 grams of aluminum hydrate (35% moisture) and 1200 grams of milled quartz were added and the whole milled for 1 hour. The mass was then dried, disintegrated, mixed and calcined at 2400° F. for 3.5 hours. Yield was 13.5 kilograms. Particle size range was 0.5 to 2.0 microns with an index of refraction 2.15.

An analysis of the compound in the foregoing example was approximately as follows:

| | Per cent |
|---|---|
| MgO | 29.70 |
| TiO₂ | 59.54 |
| SiO₂ | 9.00 |
| Al₂O₃ | 0.95 |
| Others | 0.81 |
| | 100.00 |

*Example 3.*—To 12 gallons of a solution containing 40.0 kilograms of Ti(SO₄)₂.9H₂O (equivalent to 8.0 kilograms of TiO₂) are added with stirring 9.6 kilograms of magnesium carbonate (of 42% magnesia content). After the solution of magnesia was complete we added 826 grams of Al₂(SO₄)₃.18H₂O (equivalent to 126.5 of Al₂O₃) and 1200 grams of milled quartz. The mass was neutralized with ammonia water until just neutral to methyl red. Then the thick sludge was stirred for several minutes, and evaporated to dryness, disintegrated, and calcined at 1875° F. for 2 hours. Yield equaled 13.5 kilograms. Particle size range was 0.5 to 2.0 microns with the bulk of material around 0.7 to 1.0 micron with an index of refraction 2.15.

An analysis of the compound in the foregoing example was approximately as follows:

| | Per cent |
|---|---|
| MgO | 29.50 |
| TiO₂ | 59.32 |
| SiO₂ | 9.11 |
| Al₂O₃ | 1.02 |
| Others | 1.05 |
| | 100.00 |

"Others" in the foregoing analyses include traces of CaO, Na₂O, K₂O, Fe₂O₃, P₂O₅, etc., which occur as natural impurities of the original ingredients.

As to the respective hiding powers and tinting strengths of the common form of magnesium-titanate and of our improved magnesium-titanate compositions, we have found from tests in regard to hiding power in percentages of 100, where the hiding power of the standard equals 100, as follows:

Common form of magnesium titanate is 38.5%, while our improved product is 53.2%. These values were measured by a cryptometer used for many years in the paint industry, the use of which consists in mixing a definite amount of pigment with a specified volume of refined linseed oil, and then determining the thickness of film required to hide a black edge.

As to the respective tinting strengths of the common form of magnesium-titanate and of our improved magnesium-titanate where the value for the standard equals 100, we have found from our tests that the common form of magnesium-titanate has a tinting strength of 148, while our improved product has a tinting strength of 185. Tinting strength measurements in the paint industry are more or less fixed, and consist in mixing Prussian blue with the pigment tested, and then determining the amount of mixture of the pigment plus Prussian blue that will match a definite mixture of Prussian blue and standard.

We claim as our invention:

1. A calcined synthetic magnesia-titania composition containing chiefly finely-divided magnesium titanate chemically combined with from 3 to 12% of silica and alumina, the ratio of silica to alumina ranging from 8:1 to 12:1, of particle size substantially all within the range of 0.5 to 2 microns and having a refractive index of about 2.15.

2. A calcined synthetic magnesia-titania composition containing chiefly finely-divided magnesium titanate chemically combined with from 3 to 12% of silica and alumina, the ratio of silica to alumina being about 10:1, of particle size substantially all within the range of 0.5 to 2 microns and having a refractive index of about 2.15.

3. In the method of making synthetic magnesia-titania compositions from a finely-milled batch composed chiefly of magnesia and titania in equal molecular proportions, the steps which comprise adding finely-milled silica and alumina to the batch in an amount of from 3 to 12% of the total batch, the ration of silica to alumina ranging from 8:1 to 12:1, to form an intimately-mixed mass, and then calcining said mass between 2100° and 2700° F. to cause a reaction of the ingredients thereof to form said synthetic magnesia-titania composition, of particle size substantially all within the range of 0.5 to 2 microns and having a refractive index of about 2.15.

4. In the method of making synthetic magnesia-titania compositions from a mixed solution of magnesia and titanic acid in equal molecular proportions, the steps which comprise adding finely-milled silica and alumina in soluble form in an amount of from 3 to 12% of the total ingredients calculated on the calcined oxide basis, the ratio of silica to alumina ranging from 8:1 to 12:1, to the magnesia solution to form with stirring an intimate mixture, neutralising with ammonia, then drying same and calcining the dried mass between 1800° and 1900° F. to cause a reaction of the ingredients thereof to form said synthetic magnesia-titania composition, of particle size substantially all within the range of 0.5 to 2 microns and having a refractive index of about 2.15.

5. A method of making synthetic magnesia-titania compositions, which comprises mixing in equal molecular proportions a material yielding magnesia on calcining and a material yielding titania on calcining, then adding finely-milled silica and a material yielding alumina upon heating in a amount of from 3 to 12% of the total batch, the ratio of silica to alumina ranging from 8:1 to 12:1, to form an intimately-mixed mass with said mixture yielding magnesia and titania, and finally calcining said mass between 1800° and 2700° F. to cause a reaction and chemical combination of the ingredients thereof to form said synthetic magnesia-titania composition of particle size substantially all within the range of 0.5 to 2 microns and having a refractive index of about 2.15.

JOHN A. PLUNKETT.
EUGENE WAINER.